(12) United States Patent
Nanba et al.

(10) Patent No.: US 7,635,311 B2
(45) Date of Patent: Dec. 22, 2009

(54) GOLF BALL

(75) Inventors: Atsushi Nanba, Chichibu (JP); Jun Shindo, Chichibu (JP); Hiroshi Higuchi, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 11/712,963

(22) Filed: Mar. 2, 2007

(65) Prior Publication Data

US 2008/0214324 A1    Sep. 4, 2008

(51) Int. Cl.
  *A63B 37/00*    (2006.01)
(52) U.S. Cl. ...................................... 473/351
(58) Field of Classification Search .................. 473/373, 473/377, 351, 374
  See application file for complete search history.

(56) References Cited

U.S. PATENT DOCUMENTS

| | | | |
|---|---|---|---|
| 6,561,929 B2 | 5/2003 | Watanabe | |
| 6,623,380 B2 | 9/2003 | Jordan | |
| 2005/0245657 A1* | 11/2005 | Bulpett et al. | ............... 524/418 |
| 2006/0128900 A1 | 6/2006 | Nanba et al. | |

FOREIGN PATENT DOCUMENTS

| | | |
|---|---|---|
| JP | 2002-126129 A | 5/2002 |
| JP | 2002-336383 A | 11/2002 |
| JP | 2006-167452 A | 6/2006 |

* cited by examiner

*Primary Examiner*—Raeann Trimiew
(74) *Attorney, Agent, or Firm*—Sughrue Mion, PLLC

(57) ABSTRACT

The invention provides a golf ball composed of, at least in part, a molded and crosslinked material obtained from a rubber composition made of a base rubber, a filler, an organic peroxide, an α,β-unsaturated carboxylic acid and/or metal salt thereof, and a copper salt of a saturated or unsaturated fatty acid. The molded rubber composition has a very high rebound, and is thus useful as a golf ball core for achieving an excellent flight performance.

11 Claims, No Drawings

GOLF BALL

BACKGROUND OF THE INVENTION

The present invention relates to a golf ball having a good feel on impact, a low spin rate on shots with a driver, and an excellent rebound.

Recent golf balls are predominantly two-piece or multi-piece solid golf balls having a core enclosed by a cover of one or more layer. The aim of providing a golf ball with a multi-layer construction is generally to impart the ball with all of the following qualities at the same time: a good feel on impact, a high initial velocity, and an appropriate spin rate or launch angle.

The core material present at the center of a golf ball is the part of the ball of greatest importance for conferring the golf ball with a high initial velocity. It is well known that a high initial velocity can be achieved with the use, in particular, of a core having a polybutadiene-containing rubber composition.

Also, JP-A 2002-126129 (U.S. Pat. No. 6,561,929) reports that, by using a core in which the hardness gradually increases from the center out to the surface of the core, the spin rate of the golf ball when hit can be suppressed. As is apparent from such prior-art publications, the core of a golf ball is known to exert an influence on the spin characteristics of the ball.

However, such cores leave something to be desired in terms of their initial velocity performance.

JP-A 2006-167452 (U.S. Patent Application No. 2006/128900) discloses a golf ball core which, owing to the addition of 0.1 part by weight of sulfur to the base rubber so as to increase the hardness difference between the center and surface portions of the core, has both a spin-suppressing effect and an initial velocity-increasing effect.

Yet, although such art attempts, through the addition of a suitable amount of sulfur to the base rubber, to achieve a core hardness distribution of at least a certain size and thus reduce the spin rate on shots with a driver, a still further improvement in performance is desired.

JP-A 2002-336383 (U.S. Pat. No. 6,623,380) describes art in which elemental copper is added so as to lower the PGA compression value of a rubber core by 5 or more units, thereby softening the rubber material. However, the hardness distribution at the interior of the core is not described. Moreover, because elemental copper itself has a high specific gravity, there is some concern that the core weight will become too heavy.

SUMMARY OF THE INVENTION

It is therefore an object of the present invention to provide a golf ball having a core with a hardness difference between the center portion and surface portion thereof that has not hitherto been attained with sulfur alone.

The inventor, having conducted extensive investigations in order to achieve the above object, has found that when, as an effective means for controlling the hardness distribution within a golf ball core, the copper salt of a saturated or unsaturated fatty acid is included within a rubber composition prepared by blending together a base rubber, a filler, an organic oxide, and an α,β-unsaturated carboxylic acid and/or metal salt thereof as the essential ingredients, and the rubber composition is molded under applied heat, the hardness difference between the surface hardness and center hardness of the resulting crosslinked product can be increased while maintaining the high initial velocity of the crosslinked product.

Accordingly, the present invention provides the following golf balls.

[1] A golf ball comprising a molded and crosslinked composition obtained from a rubber composition comprised of a base rubber, a filler, an organic peroxide, an α,β-unsaturated carboxylic acid and/or metal salt thereof, and a copper salt of a saturated or unsaturated fatty acid.

[2] The golf ball of [1], wherein the rubber composition includes, as the copper salt of a saturated or unsaturated fatty acid, from 0.001 to 5 parts by weight of copper stearate per 100 parts by weight of the base rubber.

[3] The golf ball of [1], wherein the rubber composition includes from 0.01 to 5 parts by weight of elemental sulfur per 100 parts by weight of the base rubber.

[4] The golf ball of [1] which has a one-piece construction and is made of the molded and crosslinked material obtained from the rubber composition.

[5] The golf ball of [1] which is a multilayer solid golf ball comprising a core and a cover of one or more layer encasing the core, wherein the core is made of the molded and crosslinked material obtained from the rubber composition.

DETAILED DESCRIPTION OF THE INVENTION

The invention is described more fully below.

The invention is directed at a golf ball which includes, as a component thereof, a molded and vulcanized material obtained from a rubber composition containing (I) a base rubber, (II) a filler, (III) an organic peroxide, (IV) an α,β-unsaturated carboxylic acid and/or metal salt thereof, and (V) a copper salt of a saturated or unsaturated fatty acid. Ingredients (I) to (V) are described below.

(I) Base Rubber

Selection of the base rubber strongly affects the properties of the core, such as the hardness and resilience. Various known rubbers may be suitably selected to obtain the desired core properties. The base rubber may be selected from among, for example, butadiene rubbers (BR), styrene-butadiene rubbers (SBR), isoprene rubbers (IR), chloroprene rubbers (CR), acrylonitrile-butadiene rubbers (NBR), ethylene-propylene-diene rubbers (EPDM), silicone rubbers, and modified forms thereof. These may be used singly or as combinations of two or more thereof. No particular limitation is imposed on conditions such as the synthesis catalyst, Mooney viscosity and molecular weight of these rubbers. The use of a high cis-content polybutadiene rubber having a cis-1,4 bond content of at least 40%, and preferably at least 90%, is especially desirable. A high cis-content polybutadiene synthesized with a lanthanide series catalyst is preferred for obtaining a high resilience, although other high-cis polybutadienes obtained with a nickel or cobalt catalyst can also be used. Specific examples include commercial products such as BR01 and BR730 produced by JSR Corporation, and CB22 and CB24 produced by Bayer AG.

(II) Filler

An inorganic filler is included as an essential ingredient in the base rubber. The main role of the inorganic filler is to adjust the weight of the rubber. Illustrative examples of the inorganic filler include zinc oxide, calcium carbonate, calcium oxide, magnesium oxide, barium sulfate and silica. The use of a metal oxide such as zinc oxide, calcium oxide or magnesium oxide is especially preferred.

(III) Organic Peroxide

The organic peroxide is used as a free radical initiator to effect crosslinking between molecules of the base rubber, and may be selected from among such compounds as dicumyl peroxide and 1,1-bis(tert-butylperoxy)cyclohexane. A single organic peroxide may be used alone or a combination of two or more may be used together. Specific examples of suitable organic peroxides include Percumyl D, Perhexa 3M and Perhexa C-40 (all products of NOF Corporation), and 231XL (Atochem Co.).

The amount of organic peroxide included per 100 parts by weight of the base rubber, while not subject to any particular limitation, is preferably at least 0.1 part by weight, and more preferably at least 0.3 part by weight, but preferably not more than 10 parts by weight, and more preferably not more than 5 parts by weight.

(IV) α,β-Unsaturated Carboxylic Acid or Metal Salt Thereof

An α,β-unsaturated carboxylic acid such as acrylic acid and methacrylic acid, and/or a metal salt thereof, is included in the rubber composition. Examples of the metal include zinc, sodium, potassium, magnesium, lithium and calcium. However, copper is not included. The α,β-unsaturated carboxylic acid is preferably selected from the group consisting of acrylic acid, methacrylic acid, ethacrylic acid, itaconic acid, maleic acid and fumaric acid. An unsaturated carboxylic acid ester, such as butyl acrylate, ethylene glycol dimethacrylate, trimethylolpropane trimethacrylate, triallylisocyanurate or glycidyl methacrylate, may also be included, either in combination with the above compound or alone.

An example of a commercial product that may be used as this ingredient is zinc acrylate produced by Nihon Jyoryu Kogyo Co., Ltd.

The amount of the foregoing compound included per 100 parts by weight of the base rubber, while not subject to any particular limitation, is preferably at least 5 parts by weight, and more preferably at least 15 parts by weight, but preferably not more than 60 parts by weight, and more preferably not more than 45 parts by weight.

(V) Copper Salt of Saturated or Unsaturated Fatty Acid

The reason for including a copper salt of a saturated or unsaturated fatty acid in the rubber composition is based on the unexpected finding that compounding a copper salt of a saturated or unsaturated fatty acid makes it possible to easily increase the hardness difference between the surface and center of a molded and crosslinked rubber material. The copper salt of a saturated or unsaturated fatty acid is represented by the following formula:

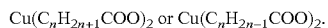

$Cu(C_nH_{2n+1}COO)_2$ or $Cu(C_nH_{2n-1}COO)_2$.

Illustrative examples of copper salts of the saturated or unsaturated fatty acid include copper stearate, copper linoleate, copper linolenate and copper oleate.

The amount of the copper salt of a saturated or unsaturated fatty acid included per 100 parts by weight of the base rubber is preferably at least 0.001 part by weight, and more preferably at least 0.01 part by weight, but not more than 5 parts by weight, and preferably not more than 4 parts by weight. At less than 0.001 part by weight, there is substantially no hardness difference increasing effect, whereas at more than 5 parts by weight, a sufficient core hardness is not achieved.

In the practice of the invention, other rubber compounding ingredients that may be suitably added include various types of inorganic compounds other than those mentioned above.

In addition, an organosulfur compound may optionally be included in the rubber composition to enhance the resilience of the molded and crosslinked rubber material. Exemplary organosulfur compounds include thiophenols, thionaphthols, halogenated thiophenols, and metal salts thereof. Specific examples include pentachlorothiophenol, pentafluorothiophenol, pentabromothiophenol, p-chlorothiophenol, and the metal salts thereof, especially the zinc salts. The amount of organosulfur compound included per 100 parts by weight of the base rubber is preferably at least 0.001 part by weight but not more than 5 parts by weight.

Moreover, elemental sulfur or an inorganic sulfur compound may be added to increase the cross-sectional hardness distribution of the molded and crosslinked rubber material. The amount of elemental sulfur or inorganic sulfur compound used in such a case is preferably from 0.01 to 5 parts by weight.

Known processing aids, such as that produced by Rhein Chemie under the trade name Aktiplast, may be added to improve the processability of the rubber composition. Other materials that may be added to the rubber composition include ground-up golf ball cores, ground-up golf ball cover stock, ground-up used golf balls, and also ground-up rubber and plastic waste generated from golf ball manufacturing operations.

If necessary, an antioxidant may be included in the rubber composition. For example, use may be made of an antioxidant such as 2,2'-methylenebis(4-methyl-6-tert-butylphenol). In such a case, the antioxidant may be included in an amount, per 100 parts by weight of the base rubber, of preferably at least 0.05 part by weight, and more preferably at least 0.1 part by weight, but preferably not more than 3 parts by weight. Examples of commercial products that may be used as the antioxidant include Nocrac NS-6, Nocrac NS-5 and Nocrac NS-30, all produced by Ouchi Shinko Chemical Industry Co., Ltd.

In addition to the above ingredients, the rubber composition may include also a suitable amount of a silicone powder. If a silicone powder is used, there is no particular limitation on the particle size of the silicone powder or the functional groups with which it is modified. It is also possible for the above rubber composition to include suitable amounts of various thermoplastic resins.

The molded and crosslinked rubber material of the invention can be obtained by using a method like that employed with known golf ball compositions to process the above-described rubber composition. The process may be one which involves, for example, masticating the rubber composition with a suitable apparatus such as a roll mill, kneader or Banbury mixer, then molding under heat and pressure using a mold. The crosslinking conditions are not subject to any particular limitations with regard to temperature and time, although it is preferable to carry out crosslinking at a temperature of between 100 and 200° C. for a period of from 10 to 40 minutes.

The molded and crosslinked rubber material has a surface hardness which, while not subject to any particular limitation, is preferably at least 70 (JIS-C hardness). The center hardness, while not subject to any particular limitation, is preferably not more than 60 (JIS-C hardness).

It is preferable for the difference between the surface hardness and the center hardness of the core to be at least 30 JIS-C hardness units, with the surface hardness being higher that the center hardness.

The golf ball of the invention may be used in any of the various forms described below. When the golf ball is, in particular, a one-piece golf ball or a golf ball having a solid core or a solid center, it is recommended that the one-piece solid golf ball or the solid core or solid center have a deflection, when subjected to a compressive load of 980 N (100 kg), of preferably at least 1.5 mm, more preferably at least 2.8 mm, and most preferably at least 3.2 mm, but preferably not more than 6.0 mm, more preferably not more than 5.5 mm, even more preferably not more than 5.0 mm, and most preferably not more than 4.5 mm. Too small a deflection may result in a poor feel on impact and, particularly on long shots such as with a driver in which the ball incurs a large deformation, may subject the ball to an excessive rise in spin, shortening the distance of travel. On the other hand, a one-piece solid golf ball or a solid core or solid center that is too soft may deaden the feel of the golf ball when played, compromise the rebound of the ball, resulting in a shorter distance, and give the ball a poor durability to cracking with repeated impact.

The golf ball of the invention is composed, at least in part, of the above-described molded and crosslinked material, but the form of the ball is not subject to any particular limitation. Examples of suitable forms of the inventive golf ball include one-piece golf balls in which the molded and crosslinked material is employed directly as the golf ball, solid two-piece golf balls wherein the molded and crosslinked material serves as a solid core on the surface of which a cover has been formed, solid multi-piece golf balls made of three or more pieces in which the molded and crosslinked material serves as a solid core over which a cover composed of two or more layers has been formed, and thread-wound golf balls in which the molded and crosslinked material serves as the center core. Solid two-piece golf balls and solid multi-piece golf balls in which the molded and crosslinked material serves as a solid core are preferred because such golf ball constructions are able to exploit most effectively the characteristics of the molded and crosslinked material, and confer the finished golf ball with a low spin rate on shots taken with a driver.

In the practice of the invention, when the molded and crosslinked material serves as a solid core, it is recommended that the solid core have a diameter of at least 25.0 mm, preferably at least 30.0 mm, more preferably at least 33.0 mm, and most preferably at least 36.0 mm, but not more than 41.0 mm, preferably not more than 40.5 mm, more preferably not more than 40.0 mm, and most preferably not more than 39.5 mm.

It is recommended that the solid core have a specific gravity which, while not subject to any specific limitation, is at least 0.9, preferably at least 1.0, and more preferably at least 1.1, but not more than 1.4, preferably not more than 1.3, and more preferably not more than 1.2.

When the golf ball of the invention is a solid two-piece golf ball or a solid multi-piece golf ball, the above-described molded and vulcanized material may be formed by injection-molding or molding under applied pressure a known cover material or intermediate layer material.

These cover and intermediate layer materials may be primarily composed of, for example, a thermoplastic or thermoset polyurethane elastomer, a polyester elastomer, an ionomer resin, or a polyolefin elastomer. Any one or mixture of two or more thereof may be used. The use of a thermoplastic polyurethane elastomer or an ionomer resin is especially preferred.

Illustrative examples of thermoplastic polyurethane elastomers that may be used for the above purpose include commercial products in which the diisocyanate is an aliphatic or aromatic compound, such as Pandex T7298, Pandex T7295, Pandex T7890, Pandex TR3080 and Pandex T8295 (all manufactured by DIC Bayer Polymer, Ltd.). Also, preferred use can be made of the cover stock, described in JP-A 2002-336378 filed by the present applicant, which is composed of the following components A and B:
(A) a thermoplastic polyurethane material, and
(B) an isocyanate mixture of (b-1) an isocyanate compound having two or more isocyanate groups as functional groups per molecule dispersed in (b-2) a thermoplastic resin which is substantially non-reactive with isocyanate.

Illustrative examples of suitable commercial ionomer resins include Surlyn 6320 and Surlyn 8120 (both products of E.I. du Pont de Nemours and Co., Inc.), and Himilan 1706, Himilan 1605, Himilan 1855, Himilan 1601 and Himilan 1557 (all products of DuPont-Mitsui Polychemicals Co., Ltd.).

The cover material or intermediate layer material may include also, as an optional ingredient together with the primary ingredients mentioned above, a polymer other than the foregoing thermoplastic elastomers. Specific examples of polymers that may be included as optional ingredients include polyamide elastomers, styrene block elastomers, hydrogenated polybutadienes and ethylene-vinyl acetate (EVA) copolymers.

The golf ball of the invention can be manufactured for competitive use by having the ball conform with the Rules of Golf; that is, by forming the ball to a diameter of not less than 42.67 mm and a weight of not more than 45.93 g. It is recommended that the diameter be not more than 44.0 mm, preferably not more than 43.5 mm, and most preferably not more than 43.0 mm; and that the weight be at least 44.5 g, preferably at least 45.0 g, more preferably at least 45.1 g, and most preferably at least 45.2 g.

As explained above, in the golf ball of the present invention, the addition of a copper salt of a saturated or unsaturated fatty acid to the rubber composition enables the hardness difference between the central portion and the surface of the core to be increased. As a result, the spin rate of the golf ball on shots taken with a driver can be reduced, which has the effect of increasing the distance traveled by the ball.

EXAMPLES

Examples of the invention and Comparative Examples are given below by way of illustration, and not by way of limitation.

Examples 1 and 2, Comparative Examples 1 to 6

The ingredients shown in Table 1 below were compounded in the indicated proportions to prepare a rubber composition. The rubber composition in each example was masticated, then hot-molded under the vulcanization temperature and time indicated below, thereby giving a core (sphere) of a given diameter.

TABLE 1

|  |  | Example | | Comparative Example | | | | | |
|---|---|---|---|---|---|---|---|---|---|
|  |  | 1 | 2 | 1 | 2 | 3 | 4 | 5 | 6 |
| cis-1,4-Polybutadiene | | 100 | 100 | 100 | 100 | 100 | 100 | 100 | 100 |
| Zinc oxide | | 19.88 | 19.88 | 19.88 | 21.46 | 19.94 | 19.90 | 19.85 | 19.82 |
| Zinc salt of pentachlorothiophenol | | 1.5 | 1.5 | 1.5 | 1.5 | 1.5 | 1.5 | 1.5 | 1.5 |
| Antioxidant | | 0.1 | 0.1 | 0.1 | 0.1 | 0.1 | 0.1 | 0.1 | 0.1 |
| Peroxide | | 3 | 3 | 3 | 3 | 3 | 3 | 3 | 3 |
| Sulfur | | 0.1 | 0.1 | 0.1 | 0.1 | 0 | 0.06 | 0.15 | 0.2 |
| Zinc acrylate | | 36.5 | 36.5 | 36.5 | 32.5 | 36.5 | 36.5 | 36.5 | 36.5 |
| Copper stearate | | 2.00 | 3.20 | 0.00 | 0.00 | 0.00 | 0.00 | 0.00 | 0.00 |
| Total | | 163.08 | 164.28 | 161.08 | 158.66 | 161.04 | 161.06 | 161.10 | 161.12 |
| Vulcanization temp. (° C.) | | 155 | 155 | 155 | 155 | 155 | 155 | 155 | 155 |
| Vulcanization time (min) | | 16 | 16 | 16 | 16 | 16 | 16 | 16 | 16 |
| Hardness profile in core cross-section (JIS-C) | Center | 56.2 | 52.4 | 66.0 | 66.0 | 72.0 | 70.00 | 66.24 | 66.24 |
| | Surface | 88.1 | 84.9 | 90.7 | 89.2 | 92.3 | 92.00 | 89.07 | 87.01 |
| | Hardness difference between surface and center | 31.9 | 32.5 | 24.7 | 23.2 | 20.3 | 22.00 | 22.82 | 20.77 |
| Core diameter (mm) | | 36.42 | 36.38 | 36.40 | 36.45 | 36.37 | 36.41 | 36.35 | 36.36 |
| Weight (g) | | 30.23 | 30.01 | 30.35 | 30.36 | 30.36 | 30.34 | 30.38 | 30.38 |
| Deflection (mm) | | 3.72 | 4.12 | 3.16 | 4.00 | 2.80 | 2.9 | 3.52 | 3.82 |

Note:
Numbers given for the compounding ingredients in Table 1 indicate parts by weight per 100 parts by weight of the polybutadiene.

Details of the ingredients mentioned in the table are given below.
cis-1,4-Polybutadiene: Produced by JSR Corporation under the trade name "BR730."
Zinc acrylate: Produced by Nihon Jyoryu Kogyo Co., Ltd.
Sulfur: Produced by Tsurumi Chemical Industry Co. Ltd. under the trade name "Z Sulfur."
Copper stearate: Produced by Terada Kogyo KK. Antioxidant: 2,2'-Methylenebis(4-methyl-6-t-butyl-phenol), produced by Ouchi Shinko Chemical Industry Co., Ltd. under the trade name "Nocrac NS-6."
Peroxide: 40% Dilution of 1,1'-bis(tert-butyl-peroxy)cyclohexane, produced by NOF Corporation under the trade name "Perhexa C-40."

The spherical molded and crosslinked body to be used as a golf ball core that was obtained in each example was subjected to core cross-sectional hardness and deflection measurements by the methods described below. The results of those measurements are also shown in Table 1.

The core cross-sectional hardness distribution was obtained by measuring the JIS-C hardness in each example in accordance with JIS K6301-1993.
(i) The surface hardness was the average of the values obtained by measurements at four randomly selected points on the core surface.
(ii) The core cross-sectional hardness was obtained by cutting the core in half and measuring the hardnesses at the positions indicated in Table 1. Each value shown in the table is the average of the values obtained at four different points located at equal distances from the center. The measurement points were located on four straight lines that pass through the center of the cross-section.

The deflection (mm) was measured by placing the spherical molded material on a hard plate and subjecting it to a compressive load of 980 N (100 kgf).

As is apparent from the results shown in Table 1, in the examples according to the present invention, the inclusion of a small amount of copper stearate within the compounding ingredients of the core-forming rubber composition increases the difference in hardness between the core surface and the core center.

The solid core thus obtained was placed in a given mold and, as shown in Table 2 below, a composition of the ionomer resin Surlyn 7930 (produced by DuPont-Mitsui Polychemicals Co., Ltd.; Shore D hardness, 64), Himilan 1605 and trimethylolpropane (TMP) was injection-molded over the core so as to form an intermediate layer having a thickness of 2.0 mm. Next, the sphere composed of the solid core encased within the intermediate layer was placed in a given mold and an urethane resin (produced by DIC Bayer Polymer, Ltd.; Shore D hardness, 54) was injection-molded over the sphere so as to form a cover having a thickness of 1.0 mm, thereby giving a three-piece solid golf ball in the respective examples of the invention and the comparative examples. The properties of the resulting golf balls were investigated as described below. Those results are shown below together with the finished golf balls. In addition, 330 dimples were formed on the surface of the golf ball cover.

TABLE 2

|  |  | Common to both examples of the invention and comparative examples |
|---|---|---|
| Intermediate layer | Himilan 1605 | 70 |
|  | Surlyn 7930 | 30 |
|  | Trimethylolpropane | 1.1 |
|  | Material hardness (Shore D) | 62 |
|  | Thickness (mm) | 2.0 |

TABLE 2-continued

|  |  | Common to both examples of the invention and comparative examples |
|---|---|---|
| Cover | Pandex | 100 |
|  | Crossnate | 18 |
|  | Material hardness (Shore D) | 55 |
|  | Thickness (mm) | 1.0 |
| Number of dimples |  | 330 |

Note:
Numbers for the intermediate layer and cover ingredients all indicate parts by weight.

Details of the above materials are given below.

Himilan 1605: Produced by DuPont-Mitsui Polychemicals Co., Ltd.

Surlyn 7930: Produced by DuPont-Mitsui Polychemicals Co., Ltd.

Pandex: Produced by DIC Bayer Polymer, Ltd.

Crossnate: An isocyanate masterbatch which is produced by Dainichi Seika Colour & Chemicals Mfg. Co., Ltd., contains 30% of 4,4'-diphenylmethane diisocyanate (measured concentration of amine reverse-titrated isocyanate according to JIS-K1556, 5 to 10%), and in which the base resin is a polyester elastomer.

The properties of the resulting multi-piece solid golf ball were investigated as described below. The results are shown in Table 3.

TABLE 3

|  | Example | | Comparative Example | | | | | |
|---|---|---|---|---|---|---|---|---|
|  | 1 | 2 | 1 | 2 | 3 | 4 | 5 | 6 |
| Diameter (mm) | 42.74 | 42.73 | 42.74 | 42.75 | 42.74 | 42.73 | 42.73 | 42.74 |
| Weight (g) | 45.54 | 45.41 | 45.61 | 45.62 | 45.62 | 45.61 | 45.63 | 45.63 |
| Deflection under 980 N (100 kg) load (mm) | 2.37 | 2.55 | 2.12 | 2.50 | 1.96 | 2.00 | 2.28 | 2.42 |
| Rebound (ratio relative to rebound of ball obtained in Comparative Example 1) | 99.00 | 98.21 | 100 | 99.67 | 100.57 | 100.23 | 99.72 | 99.43 |
| Spin rate on shot with driver (rpm) | 2626 | 2606 | 2650 | 2620 | 2707 | 2696 | 2640 | 2634 |

Rebound

Using a specific measuring instrument, the rebound was determined during measurement with an initial velocity measuring apparatus of the same type as that of the United States Golf Association (USGA)—the official golf ball regulating body. The rebound results are indicated in the table as ratios based on the value obtained in Comparative Example 1.

Spin Performance

A driver (X-Drive Type 300 PROSPEC, manufactured by Bridgestone Sports Co., Ltd.; loft angle, 10°) was mounted on a swing robot (manufactured by Miyamae Co., Ltd.), and the spin rate of a ball hit at a head speed (HS) of 45 m/s was measured using a high-speed camera.

As is apparent from Table 3, compared with Comparative Example 1 in which copper stearate was not included in the rubber composition, the spin rate on shots with a driver was lower for the golf balls obtained in Examples 1 and 2 of the invention, in which copper stearate was included.

Examples 3 and 4, Comparative Examples 7 and 8

Rubber compositions containing the various ingredients shown in Table 4 were prepared. In each example, the rubber composition was masticated, then hot-molded under the vulcanization temperature and time indicated below to give a core (sphere) of a given diameter. The molded and crosslinked core material obtained in each example was subjected to core cross-sectional hardness and deflection measurements by the same methods as described above for Example 1. Those results are shown in Table 5.

TABLE 4

|  | Comparative Example 7 | Example 3 | Comparative Example 8 | Example 4 |
|---|---|---|---|---|
| cis-1,4-Polybutadiene | 100 | 100 | 100 | 100 |
| Zinc oxide | 23.16 | 23.16 | 25.73 | 25.73 |
| Zinc stearate | 5 | 5 | 5 | 5 |
| Zinc salt of pentachlorothiophenol | 1 | 1 | — | — |
| Peroxide | 3 | 3 | 3 | 3 |

TABLE 4-continued

|  | Comparative Example 7 | Example 3 | Comparative Example 8 | Example 4 |
|---|---|---|---|---|
| Zinc acrylate | 35 | 35 | 30 | 30 |
| Copper stearate | 0 | 0.05 | 0 | 0.05 |
| Total | 167.16 | 167.21 | 163.73 | 163.78 |
| Vulcanization temperature (° C.) | 155 | 155 | 155 | 155 |
| Vulcanization time (min) | 16 | 16 | 16 | 16 |

Note:
Numbers shown for the respective compounding ingredients in Table indicate parts by weight per 100 parts by weight of polybutadiene.

Details concerning the various ingredients appearing in the table are the same as those appearing in Table 1.

TABLE 5

|  |  | Comparative Example 7 | Example 3 | Comparative Example 8 | Example 4 |
|---|---|---|---|---|---|
| Hardness profile in core cross-section (JIS-C hardness) | Center | 72.4 | 69 | 69.2 | 60.6 |
|  | Surface | 91.3 | 92.2 | 93.1 | 88.3 |
|  | Hardness difference between surface and center | 18.9 | 23.2 | 23.9 | 27.7 |
| Core diameter (mm) |  | 37.41 | 37.51 | 37.43 | 37.4 |
| Weight (g) |  | 32.84 | 33.09 | 33.16 | 32.93 |
| Deflection (mm) |  | 2.55 | 2.41 | 2.36 | 3.08 |

It is apparent from the results in Table 5 that, although Examples 3 and 4 of the invention differ from Examples 1 and 2 according the invention in that elemental sulfur was not included in the rubber composition, by including copper stearate in the rubber composition, the difference between the surface hardness and the center hardness of the core is nonetheless large. This demonstrates that the spin rate on shots taken with a driver can be reduced.

The invention claimed is:

1. A golf ball comprising a molded and crosslinked material obtained from a rubber composition comprised of a base rubber, a filler, an organic peroxide, an α,β-unsaturated carboxylic acid and/or metal salt thereof, a copper salt of a saturated or unsaturated fatty acid and elemental sulfur, wherein said molded and crosslinked material has a surface hardness and a center hardness, and the surface hardness is higher than the center hardness by at least 30 JIS-C hardness units, wherein the rubber composition includes, as the copper salt of a saturated or unsaturated fatty acid, from 0.001 to 5 parts by weight of copper stearate per 100 parts by weight of the base rubber.

2. The golf ball of claim 1, wherein the rubber composition includes from 0.01 to 5 parts by weight of the elemental sulfur per 100 parts by weight of the base rubber.

3. The golf ball of claim 1 which has a one-piece construction and is made of the molded and crosslinked material obtained from the rubber composition.

4. The golf ball of claim 1, wherein the rubber composition includes from 0.001 to 5 parts by weight of an organosulfur compound.

5. The golf ball of claim 1, wherein the golf ball exhibits a deflection of 2.8 mm to 5.0 mm when subjected to a compressive load of 980 N (100 kg).

6. The golf ball of claim 1, wherein the golf ball exhibits a deflection of 3.2 mm to 4.5 mm when subjected to a compressive load of 980 N (100 kg).

7. The golf ball of claim 1 which is a multilayer solid golf ball comprising a core and a cover of one or more layer encasing the core, wherein the core is made of the molded and crosslinked material obtained from the rubber composition.

8. The golf ball of claim 7, wherein the core exhibits a deflection of 2.8 mm to 5.0 mm when subjected to a compressive load of 980 N (100 kg).

9. The golf ball of claim 7, wherein the core exhibits a deflection of 3.2 mm to 4.5 mm when subjected to a compressive load of 980 N (100 kg).

10. The golf ball of claim 7, wherein the core has a specific gravity of from 0.9 to 1.4.

11. The golf ball of claim 7, wherein the core has a specific gravity of from 1.1 to 1.2.

* * * * *